(12) United States Patent
Kouno et al.

(10) Patent No.: US 10,150,865 B2
(45) Date of Patent: Dec. 11, 2018

(54) RESIN COMPOSITION AND MOLDED OBJECT OBTAINED THEREFROM

(71) Applicant: MITSUBISHI GAS CHEMICAL COMPANY, INC., Tokyo (JP)

(72) Inventors: Kazuki Kouno, Kanagawa (JP); Hisayuki Kuwahara, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/535,580

(22) PCT Filed: Mar. 14, 2016

(86) PCT No.: PCT/JP2016/057887
§ 371 (c)(1),
(2) Date: Jun. 13, 2017

(87) PCT Pub. No.: WO2016/158332
PCT Pub. Date: Oct. 6, 2016

(65) Prior Publication Data
US 2017/0327685 A1 Nov. 16, 2017

(30) Foreign Application Priority Data
Mar. 30, 2015 (JP) ................. 2015-069990

(51) Int. Cl.
*C08L 69/00* (2006.01)
*C08L 33/08* (2006.01)

(52) U.S. Cl.
CPC ............ *C08L 69/00* (2013.01); *C08L 33/08* (2013.01); *C08L 2201/10* (2013.01); *C08L 2205/02* (2013.01); *C08L 2205/025* (2013.01); *C08L 2205/03* (2013.01); *C08L 2205/06* (2013.01)

(58) Field of Classification Search
CPC .............. C08L 69/00; C08L 2201/10; C08L 2205/025; C08L 2205/02; C08L 2205/03
See application file for complete search history.

(56) References Cited

U.S. PATENT DOCUMENTS

| | | | |
|---|---|---|---|
| 4,906,696 A | 3/1990 | Fischer et al. | |
| 5,169,885 A | 12/1992 | Hanayama et al. | |
| 9,156,931 B2 | 10/2015 | Kobayashi et al. | |
| 9,802,395 B2 | 10/2017 | Onishi et al. | |
| 2002/0040081 A1 | 4/2002 | Stein et al. | |
| 2010/0152357 A1* | 6/2010 | Kwon et al. | C08L 33/08 524/502 |
| 2010/0168272 A1 | 7/2010 | Park et al. | |
| 2014/0148525 A1 | 5/2014 | Kobayashi et al. | |
| 2014/0371375 A1 | 12/2014 | Chung et al. | |
| 2015/0057422 A1 | 2/2015 | Kondo et al. | |
| 2015/0210851 A1 | 7/2015 | Tatima | |
| 2016/0215139 A1 | 7/2016 | Kouno et al. | |
| 2017/0198139 A1 | 7/2017 | Kouno et al. | |

FOREIGN PATENT DOCUMENTS

| | | |
|---|---|---|
| EP | 0 263 378 | 4/1988 |
| JP | 62-131056 | 6/1987 |
| JP | 63-139935 | 6/1988 |
| JP | 64-001749 | 1/1989 |
| JP | 4-359954 | 12/1992 |
| JP | 9-25438 | 1/1997 |
| JP | 2010-116501 | 5/2010 |
| JP | 2011-500914 | 1/2011 |
| JP | 2011-016900 | 2/2011 |
| JP | 2012-236871 | 12/2012 |

(Continued)

OTHER PUBLICATIONS

Decision to Grant from Japanese application JP 2016-551328, dated Feb. 7, 2017, with English translation thereof.
Notification of Reasons for Refusal from Japanese application JP 2016-551328, dated Nov. 8, 2016, with English translation thereof.
Written Argument dated Oct. 6 from Japanese application JP 2016-551328, Dec. 9, 2016, with English translation thereof.
Written Amendment dated Oct. 6 from Japanese application JP 2016-551328, Dec. 9, 2016, with English translation thereof.
International Search Report issued in Patent Application No. PCT/JP2016/057887, dated Jun. 14, 2016.

(Continued)

*Primary Examiner* — Nathan M Nutter
(74) *Attorney, Agent, or Firm* — Greenblum & Bernstein, P.L.C.

(57) ABSTRACT

According to one embodiment, the present invention provides a resin composition, which comprises a polymer (A) containing 45% by mass or more of a (meth)acrylate unit (a) represented by the following formula (1), a polymer (B) containing 60% by mass or more of a methyl (meth)acrylate unit (b) and having a mass average molecular weight of 5,000 to 20,000, and a polycarbonate-based resin (C).

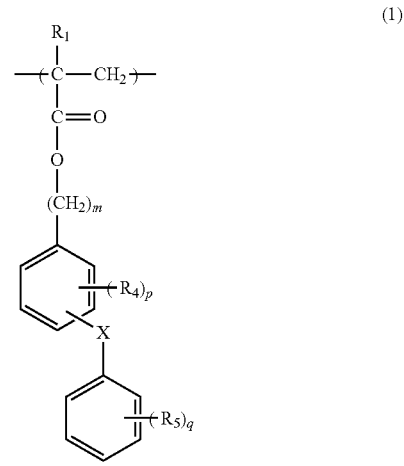

(1)

14 Claims, No Drawings

(56) References Cited

FOREIGN PATENT DOCUMENTS

| | | |
|---|---|---|
| JP | 2013-067793 | 4/2013 |
| JP | 2014-062148 | 4/2014 |
| JP | 2014-62148 | 4/2014 |
| JP | 2014-065901 | 4/2014 |
| JP | 2014-210892 | 11/2014 |
| JP | 2015-042735 | 3/2015 |
| KR | 10-2010-0076643 | 7/2010 |
| TW | 201024372 | 7/2010 |
| WO | 2009/051373 | 4/2009 |
| WO | 2012/157324 | 11/2012 |
| WO | 2013/094898 | 6/2013 |
| WO | 2013/136410 | 9/2013 |
| WO | 2015/093516 | 6/2015 |

OTHER PUBLICATIONS

Office Action from U.S. Appl. No. 14/917,110, dated Dec. 2, 2016.
Office Action from U.S. Appl. No. 14/917,110, dated Apr. 28, 2017.
Office Action from U.S. Appl. No. 14/917,110, dated Jan. 4, 2018.
Office Action from U.S. Appl. No. 15/324,416, dated Feb. 21, 2018.

\* cited by examiner

RESIN COMPOSITION AND MOLDED OBJECT OBTAINED THEREFROM

TECHNICAL FIELD

The present invention relates to a resin composition and a molded object obtained from the resin composition.

BACKGROUND ART

Due to their excellent mechanical strength, heat resistance, electrical properties, dimensional stability, flame retardancy, transparency and so on, polycarbonate-based resins are widely used for electrical, electronic and OA appliances, optical media, automobile components, building components, etc.

Such polycarbonate-based resins are generally produced by the interface process for direct reaction between bisphenol A (aromatic dihydroxy compound) and phosgene or by the melt process for transesterification reaction (polycondensation reaction) between bisphenol A and diphenyl carbonate (carbonic acid diester) in molten state, etc.

However, molded objects obtained from these polycarbonate-based resins produced by using bisphenol A as an aromatic dihydroxy compound do not have sufficient surface hardness for use in outdoor applications, e.g., automobile head lamps, spectacle lenses, sheets and so on.

For this reason, polycarbonate-based resins may be provided with a hard coat layer or the like on their surface to improve their surface hardness.

However, to provide a hard coat layer or the like on the surface, the production process requires one more step, so that the production efficiency will be reduced. Further, in the case of molded objects having complicated shapes, it is difficult to provide a hard coat layer on their surface.

Many studies have now been conducted to blend polycarbonate-based resins with a particular type of resin in an attempt to improve their surface hardness while maintaining their transparency. There are proposed many cases where acrylic resins, which are transparent as in the case of polycarbonate-based resins, are used as resins to be blended with polycarbonate-based resins. For example, Patent Documents 1 and 2 disclose resin compositions each comprising a polycarbonate-based resin and an acrylic resin whose molecular weight is within a particular range.

Moreover, there are also proposed cases where acrylic copolymers are blended with polycarbonate-based resins. For example, Patent Documents 3 to 7 disclose resin compositions each comprising a polycarbonate-based resin and a (meth)acrylic copolymer.

PRIOR ART DOCUMENTS

Patent Documents

Patent Document 1: JPS62-131056 A
Patent Document 2: JPS63-139935 A
Patent Document 3: JPS64-1749 A
Patent Document 4: JP2010-116501 A
Patent Document 5: JPH4-359954 A
Patent Document 6: JP2011-500914 A
Patent Document 7: WO2013/094898
Patent Document 8: JP2014-62148 A

SUMMARY OF THE INVENTION

Problem to be Solved by the Invention

In the resin compositions proposed in Patent Documents 1 to 7 shown above, it is difficult to provide not only sufficient surface hardness but also transparency to molded articles, or alternatively, their molding conditions are very narrow and hence both physical properties, i.e., surface hardness and transparency can be achieved only under limited conditions. Likewise, in the resin composition proposed in Patent Document 8 shown above, further improvements are also required for various properties including surface hardness and transparency.

In particular, molded objects tend to have reduced transparency as the molding temperature increases and further as the injection speed increases in the case of injection molding. Increasing the molding temperature or increasing the injection speed will serve as an important factor for improvement in productivity and/or for production of thinner molded objects.

Thus, the present invention aims to provide a resin composition which can be molded under a wide range of molding conditions and can give a molded object excellent in surface hardness and transparency. Moreover, the present invention also aims to provide a molded article obtained from this resin composition and a blend of (meth)acrylic polymers constituting this resin composition.

Means to Solve the Problem

As a result of extensive and intensive efforts made to solve the problems stated above, the inventors of the present invention have found that when a blend of a polymer containing a (meth)acrylate unit with a particular skeletal structure and a polymer containing a methyl (meth)acrylate unit with a particular molecular weight is mixed with a polycarbonate-based resin, the resulting resin composition can be molded under a wide range of molding conditions and can give a molded object excellent in surface hardness and transparency. This finding led to the completion of the present invention. Namely, the present invention is as follows, by way of example.

[1] A resin composition, which comprises a polymer (A) containing 45% by mass or more of a (meth)acrylate unit (a) represented by the following formula (1), a polymer (B) containing 60% by mass or more of a methyl (meth)acrylate unit (b) and having a mass average molecular weight of 5,000 to 20,000, and a polycarbonate-based resin (C):

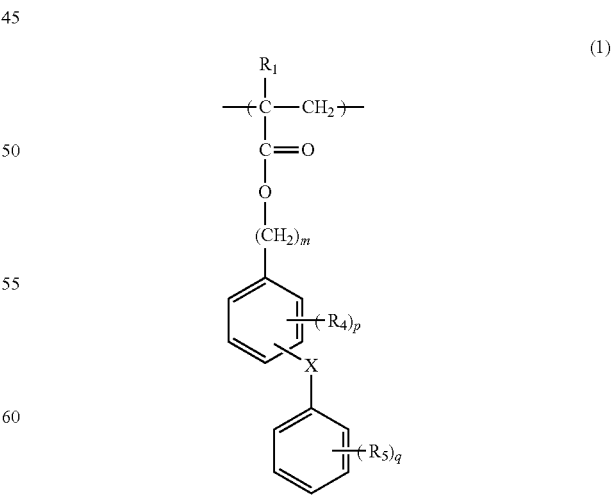

(wherein in formula (1),
X is a single bond or a divalent group selected from the group consisting of —C($R_2$)($R_3$)—, —C(=O)—, —O—, —OC(=O)—, —OC(=O)O—, —S—, —SO—, —SO$_2$— and any combination thereof (wherein R$_2$ and R$_3$ are each independently a hydrogen atom, a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a phenyl group or a phenylphenyl group; or R$_2$ and R$_3$ may be linked to each other together with the carbon atom to which they are attached to thereby form a cyclic alkyl group containing 3 to 10 carbon atoms);

R$_1$ is a hydrogen atom or a methyl group;

R$_4$ and R$_5$ are each independently a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a halogen atom, a phenyl group or a phenylphenyl group;

m is an integer of 1 to 10;
p is an integer of 0 to 4; and
q is an integer of 0 to 5).

[2] The resin composition according to [1] above, wherein the polymer (A) contains 50% by mass or more of the (meth)acrylate unit (a) represented by formula (1).

[3] The resin composition according to [1] or [2] above, wherein in formula (1), m is an integer of 1 to 3.

[4] The resin composition according to any one of [1] to [3] above, wherein in formula (1), X is a single bond, —C(R$_2$)(R$_3$)—, —C(=O)—, —O—, —SO— or —SO$_2$—.

[4-1] The resin composition according to any one of [1] to [4] above, wherein
X is a single bond, —C(R$_2$)(R$_3$)—, —C(=O)—, —SO— or —SO$_2$—;
R$_1$ is a hydrogen atom or a methyl group;
R$_4$ and R$_5$ are each independently a methyl group, a methoxy group, a chloro group, a bromo group or a phenyl group;
m is an integer of 1 to 3;
p is an integer of 0 to 1; and
q is an integer of 0 to 2.

[5] The resin composition according to any one of [1] to [4-1] above, wherein in formula (1), p and q are each 0.

[5-1] The resin composition according to any one of [1] to [5] above, wherein the polymer (B) consists of a methyl methacrylate unit and/or a methyl acrylate unit.

[6] The resin composition according to any one of [1] to [5-1] above, wherein the combined content of the polymer (A) and the polymer (B) is 5% to 60% by mass and the content of the polycarbonate-based resin (C) is 40% to 95% by mass.

[7] The resin composition according to [6] above, wherein the mass ratio ((A)/(B)) of the polymer (A) and the polymer (B) is 0.5/99.5 to 30/70.

[7-1] The resin composition according to any one of [1] to [7] above, which has a haze of 12% or less when prepared into a plate strip of 1.5 mm thickness by melt kneading of its materials and injection molding at an injection temperature of 300° C., at an injection speed of 300 m/sec and at a die temperature of 80° C.

[7-2] The resin composition according to [7-1] above, wherein the pencil hardness of the plate strip is HB or higher.

[8] A blend, which comprises a polymer (A) containing 45% by mass or more of a (meth)acrylate unit (a) represented by the following formula (1), and a polymer (B) containing 60% by mass or more of a methyl (meth)acrylate unit (b) and having a mass average molecular weight of 5,000 to 20,000:

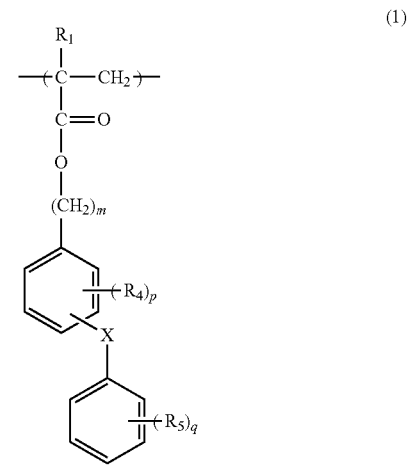

(1)

(wherein in formula (1),

X is a single bond or a divalent group selected from the group consisting of —C(R$_2$)(R$_3$)—, —C(=O)—, —O—, —OC(=O)—, —OC(=O)O—, —S—, —SO—, —SO$_2$— and any combination thereof (wherein R$_2$ and R$_3$ are each independently a hydrogen atom, a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a phenyl group or a phenylphenyl group; or R$_2$ and R$_3$ may be linked to each other together with the carbon atom to which they are attached to thereby form a cyclic alkyl group containing 3 to 10 carbon atoms);

R$_1$ is a hydrogen atom or a methyl group;

R$_4$ and R$_5$ are each independently a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a halogen atom, a phenyl group or a phenylphenyl group;

m is an integer of 1 to 10;
p is an integer of 0 to 4; and
q is an integer of 0 to 5).

[9] The blend according to [8] above, wherein the polymer (A) contains 50% by mass or more of the (meth)acrylate unit (a) represented by formula (1).

[10] The blend according to [8] or [9] above, wherein in formula (1), m is an integer of 1 to 3.

[11] The blend according to any one of [8] to [10] above, wherein in formula (1), X is a single bond, —C(R$_2$)(R$_3$)—, —C(=O)—, —O—, —SO— or —SO$_2$—.

[11-1] The blend according to any one of [8] to [11] above, wherein
X is a single bond, —C(R$_2$)(R$_3$)—, —C(=O)—, —SO— or —SO$_2$—;
R$_1$ is a hydrogen atom or a methyl group;

$R_4$ and $R_5$ are each independently a methyl group, a methoxy group, a chloro group, a bromo group or a phenyl group;

m is an integer of 1 to 3;
p is an integer of 0 to 1; and
q is an integer of 0 to 2.

[12] The blend according to any one of [8] to [11-1] above, wherein in formula (1), p and q are each 0.

[12-1] The blend according to any one of [8] to [12] above, wherein the polymer (B) consists of a methyl methacrylate unit and/or a methyl acrylate unit.

[13] The blend according to any one of [8] to [12-1] above, wherein the mass ratio ((A)/(B)) of the polymer (A) and the polymer (B) is 0.5/99.5 to 30/70.

[14] A molded object obtained by molding the resin composition according to any one of [1] to [7] above.

[14-1] A molded object molded from the resin composition according to any one of [1] to [7] above.

Effects of the Invention

The present invention enables the provision of a resin composition from which a molded object excellent in surface hardness and transparency can be produced under a wide range of molding conditions. In particular, this resin composition allows injection molding at high speed and hence results in improved productivity. Moreover, the present invention also enables the provision of a molded article obtained from the above resin composition and a blend of (meth)acrylic polymers constituting the above resin composition.

DESCRIPTION OF EMBODIMENTS

An illustrative embodiment of the present invention will be described in more detail below.

The resin composition of this embodiment comprises a polymer (A) containing 45% by mass or more of a (meth)acrylate unit (a) represented by the following general formula (1), a polymer (B) containing 60% by mass or more of a methyl (meth)acrylate unit (b) and having a weight average molecular weight of 5,000 to 20,000, and a polycarbonate-based resin (C).

The resin composition of this embodiment allows production of a molded object with excellent surface hardness as a result of comprising the (meth)acrylic polymers, while maintaining excellent transparency inherent to the polycarbonate-based resin.

As described above, in the case of prior art resin compositions comprising a polycarbonate-based resin in combination with other type of resin, the resulting molded objects tend to have reduced transparency as the molding temperature increases (about 280° C. or higher) and further as the injection speed increases (about 150 mm/sec or higher) in the case of injection molding. However, the resin composition of this embodiment can give molded objects excellent in transparency even when molded under high temperature conditions and further at high injection speed in the case of injection molding.

It is not certain why molded articles with high transparency are obtained as mentioned above. However, in the (meth)acrylate unit (a) represented by general formula (1) which is described later, the benzene rings in the ester moiety would have the effect of improving the transparency of molded objects. In particular, such a (meth)acrylate unit having two or more benzene rings is excellent in compatibility with the polycarbonate-based resin (C), so that the transparency of molded objects can be maintained under a wide range of molding conditions.

On the other hand, the reason that the resin composition of this embodiment has excellent surface hardness would be because the methyl (meth)acrylate unit (b) excellent in terms of surface hardness is contained in a certain amount. This effect can also be obtained under any molding conditions. Thus, the resin composition of this embodiment can be used to obtain a molded article having not only high transparency but also high surface hardness under a wide range of conditions. As a result of obtaining a good molded article under a wide range of conditions, the resin composition of this embodiment allows efficient and inexpensive production of molded articles. The resin composition of this embodiment can be used in a wide range of fields, as exemplified by applications requiring transparency such as materials for optical media, applications requiring good color development such as casings, etc.

The individual components contained in the resin composition of this embodiment will be described in order below.

[Polymer (A)]

The polymer (A), which is a component constituting the resin composition of this embodiment, contains 45% by mass or more of a (meth)acrylate unit (a) represented by general formula (1) described later. A detailed explanation will be given below.

In this embodiment, the (meth)acrylate unit (a) is represented by the following general formula (1). It should be noted that an acrylate unit and a methacrylate unit are collectively herein referred to as a (meth)acrylate unit. Likewise, the expression "polymer" used herein also includes a copolymer.

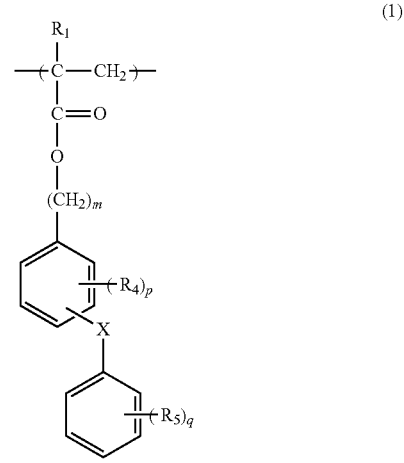

(1)

The above (meth)acrylate unit (a) represented by general formula (1) is structurally characterized in that it has two or more benzene rings in the ester moiety and in that the oxygen atom in the ester moiety is not directly attached to these benzene rings. The (meth)acrylate unit (a) is excellent in compatibility with the polycarbonate-based resin (C) and therefore contributes to improvement in the transparency of the resulting molded objects.

In the above general formula (1), $R_1$ is a hydrogen atom or a methyl group, and is preferably a methyl group.

X is a single bond or a divalent group selected from the group consisting of —C($R_2$)($R_3$)—, —C(=O)—, —O—, —OC(=O)—, —OC(=O)O—, —S—, —SO—, —SO$_2$— and any combination thereof, wherein $R_2$ and $R_3$ are each independently a hydrogen atom, a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a phenyl group or a phenylphenyl group. These groups may each have a substituent(s), and examples of such a substituent include a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a halogen atom and so on.

X is preferably a single bond, —C($R_2$)($R_3$)—, —C(=O)—, —O—, —SO— or —$SO_2$—, and is more preferably a single bond. $R_2$ and $R_3$ are preferably each independently selected from a hydrogen atom, a methyl group, a methoxy group, a phenyl group and a phenylphenyl group, with a hydrogen atom being more preferred. $R_2$ and $R_3$ may be linked to each other together with the carbon atom to which they are attached to thereby form a cyclic alkyl group containing 3 to 10 carbon atoms.

$R_4$ and $R_5$ are each independently a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a halogen atom, a phenyl group or a phenylphenyl group. These groups may each have a substituent(s), and examples of such a substituent include a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a halogen atom and so on.

$R_4$ and $R_5$ are preferably each independently selected from a methyl group, a methoxy group, a chloro group, a bromo group and a phenyl group, with a phenyl group being more preferred.

m is an integer of 1 to 10, preferably an integer of 1 to 3, and more preferably 1.

p is an integer of 0 to 4, preferably an integer of 0 to 1, and more preferably 0.

q is an integer of 0 to 5, preferably an integer of 0 to 2, and more preferably 0.

A (meth)acrylate constituting the above (meth)acrylate unit represented by general formula (1) may be exemplified by 4-phenylbenzyl (meth)acrylate, 3-phenylbenzyl (meth)acrylate, 2-phenylbenzyl (meth)acrylate, 4-biphenylbenzyl (meth)acrylate, 3-biphenylbenzyl (meth)acrylate, 2-biphenylbenzyl (meth)acrylate, 4-benzylbenzyl (meth)acrylate, 3-benzylbenzyl (meth)acrylate, 2-benzylbenzyl (meth)acrylate, 4-phenethylbenzyl (meth)acrylate, 3-phenethylbenzyl (meth)acrylate, 2-phenethylbenzyl (meth)acrylate, 4-phenethylphenethyl (meth)acrylate, 3-phenethylphenethyl (meth)acrylate, 2-phenethylphenethyl (meth)acrylate, 4-(4-methylphenyl)benzyl (meth)acrylate, 3-(4-methylphenyl)benzyl (meth)acrylate, 2-(4-methylphenyl)benzyl (meth)acrylate, 4-(4-methoxyphenyl)benzyl (meth)acrylate, 3-(4-methoxyphenyl)benzyl (meth)acrylate, 2-(4-methoxyphenyl)benzyl (meth)acrylate, 4-(4-bromophenyl)benzyl (meth)acrylate, 3-(4-bromophenyl)benzyl (meth)acrylate, 2-(4-bromophenyl)benzyl (meth)acrylate, 4-benzoylbenzyl (meth)acrylate, 3-benzoylbenzyl (meth)acrylate, 2-benzoylbenzyl (meth)acrylate, 4-(phenylsulfinyl)benzyl (meth)acrylate, 3-(phenylsulfinyl)benzyl (meth)acrylate, 2-(phenylsulfinyl)benzyl (meth)acrylate, 4-(phenylsulfonyl)benzyl (meth)acrylate, 3-(phenylsulfonyl)benzyl (meth)acrylate, 2-(phenylsulfonyl)benzyl (meth)acrylate, 4-((phenoxycarbonyl)-oxy)benzyl (meth)acrylate, 3-((phenoxycarbonyl)oxy)benzyl (meth)acrylate, 2-((phenoxycarbonyl)oxy)benzyl (meth)acrylate, 4-(((meth)acryloxy)methyl)phenyl benzoate, 3-(((meth)acryloxy)methyl) phenyl benzoate, 2-(((meth)acryloxy)methyl)-phenyl benzoate, phenyl 4-(((meth)acryloxy)methyl)benzoate, phenyl 3-(((meth)acryloxy)methyl)benzoate, phenyl 2-(((meth)acryloxy)methyl)benzoate, 4-(1-phenylcyclohexyl)benzyl (meth)acrylate, 3-(1-phenylcyclohexyl)benzyl (meth)acrylate, 2-(1-phenylcyclohexyl)benzyl (meth)acrylate, 4-phenoxybenzyl (meth)acrylate, 3-phenoxybenzyl (meth)acrylate, 2-phenoxybenzyl (meth)acrylate, 4-(phenylthio)benzyl (meth)acrylate, 3-(phenylthio)benzyl (meth)acrylate, 2-(phenylthio)benzyl (meth)acrylate or 3-methyl-4-(2-methylphenyl)benzyl methacrylate. These (meth)acrylates may be used either alone or in combination. Among them, preferred is 4-phenylbenzyl (meth)acrylate, 3-phenylbenzyl (meth)acrylate, 2-phenylbenzyl (meth)acrylate, 4-biphenylbenzyl (meth)acrylate, 3-biphenylbenzyl (meth)acrylate, 2-biphenylbenzyl (meth)acrylate, 4-benzylbenzyl (meth)acrylate, 4-phenoxybenzyl (meth)acrylate or 4-(phenylsulfonyl)benzyl (meth)acrylate, and more preferred is 4-phenylbenzyl (meth)acrylate, 3-phenylbenzyl (meth)acrylate or 2-phenylbenzyl (meth)acrylate.

The polymer (A) in this embodiment comprises the (meth)acrylate unit (a) represented by general formula (1) at a ratio of 45% by mass or more, preferably 50% by mass or more, more preferably 60% by mass or more, particularly preferably 80% by mass or more, most preferably 90% by mass or more, relative to all the constituent units of the polymer (A). The polymer (A) is required to be added for the purpose of improving the compatibility between the polymer (B) and the polycarbonate-based resin (C) described later, although the improvement of this compatibility depends on the ratio of the (meth)acrylate unit (a) in the polymer (A). For this reason, the ratio of the (meth)acrylate unit (a) in the polymer (A) is preferably 45% to 99% by mass, more preferably 50% to 99% by mass, and particularly preferably 60% to 97% by mass.

If the ratio of the (meth)acrylate unit (a) in the polymer (A) is 45% by mass or more, the compatibility between the polymer (B) and the polycarbonate-based resin (C) is improved sufficiently to maintain the transparency of the polycarbonate-based resin (C). On the other hand, the ratio of the (meth)acrylate unit (a) in the polymer (A) is preferably 99% by mass or less, because other monomers as described later may be copolymerized so as to prevent thermal decomposition.

For preparation of the polymer (A), an additional constituent unit(s) derived from other monomer(s) (hereinafter also referred to as component (c)) may optionally be copolymerized at a ratio of 55% by mass or less, preferably 50% by mass or less, more preferably 40% by mass or less, particularly preferably 20% by mass or less, most preferably 10% by mass or less. The component (c) is not limited in any way as long as the properties of the resin composition are not adversely affected, and examples include methacrylates (e.g., methyl methacrylate, ethyl methacrylate, butyl methacrylate, propyl methacrylate, 2-ethylhexyl methacrylate); acrylates (e.g., methyl acrylate, ethyl acrylate, butyl acrylate, propyl acrylate, 2-ethylhexyl acrylate, glycidyl acrylate); vinyl cyanide monomers (e.g., acrylonitrile, methacrylonitrile); diene-based monomers (e.g., butadiene, isoprene, dimethylbutadiene); vinyl ether-based monomers (e.g., vinyl methyl ether, vinyl ethyl ether); carboxylic acid-based vinyl monomers (e.g., vinyl acetate, vinyl butyrate); olefin-based monomers (e.g., ethylene, propylene, isobutylene); ethylene-based unsaturated carboxylic acid monomers (e.g., acrylic acid, methacrylic acid, maleic acid, itaconic acid); halogenated vinyl monomers (e.g., vinyl chloride, vinylidene chloride); maleimide-based monomers (e.g., maleimide, N-phenylmaleimide, N-cyclohexylmaleimide, N-methylmaleimide); crosslinking agents (e.g., allyl (meth) acrylate, divinylbenzene, 1,3-butylene dimethacrylate), etc. Among them, preferred are methacrylates, acrylates or vinyl cyanide monomers, and more preferred are methacrylates or acrylates. These monomers may be used either alone or in combination.

If the polymer (A) is prepared by copolymerization of the (meth)acrylate unit (a) with a constituent unit derived from the component (c), the constituent unit derived from the component (c) is preferably contained at a ratio of 0.1% to 5% by mass, more preferably 0.5% to 4% by mass, particularly preferably 1% to 3% by mass, relative to the polymer (A).

The polymer (A) preferably has a mass average molecular weight of 50,000 to 5,000,000, more preferably 80,000 to 3,000,000, particularly preferably 100,000 to 2,000,000. If the mass average molecular weight is 50,000 to 5,000,000, it ensures good compatibility with the polycarbonate-based resin (C) and is also preferred in terms of mechanical properties and surface hardness.

There is no particular limitation on the polymerization process required to obtain the polymer (A) in this embodiment, and any known technique may be used for this purpose, as exemplified by emulsion polymerization, suspension polymerization, solution polymerization, bulk polymerization, etc. Preferred is suspension polymerization or bulk polymerization, and more preferred is suspension polymerization. In addition, an additive(s) and others required for polymerization may optionally be added as appropriate, and examples of such an additive include a polymerization initiator, an emulsifier, a dispersant, a chain transfer agent, etc.

The polymerization temperature will vary depending on the structure and composition of monomers to be polymerized and/or the type of additive such as a polymerization initiator, but it is preferably 50° C. to 150° C., and more preferably 70° C. to 130° C. It should be noted that polymerization may be conducted under stepwise heating conditions.

The polymerization time will vary depending on the polymerization process to be used, the structure and composition of monomers to be polymerized and/or the type of additive such as a polymerization initiator, but it is preferably 1 hour to 8 hours, more preferably 2 hours to 6 hours, at the desired temperature. It should be noted that the time required to reach the desired temperature is further included in the above polymerization time.

The reaction pressure will vary depending on the polymerization process to be used, the structure and composition of monomers to be polymerized, etc., but polymerization is preferably conducted at 0 MPa (normal pressure) to 3 MPa, more preferably at 0 MPa (normal pressure) to 1 MPa.

[Polymer (B)]

The polymer (B) in this embodiment contains 60% by mass or more of a methyl (meth)acrylate unit (b) and has a weight average molecular weight of 5,000 to 20,000.

The content of the methyl (meth)acrylate unit (b) is 60% by mass or more, preferably 80% by mass or more, more preferably 90% by mass or more, and even more preferably 95% by mass or more, relative to all the constituent units of the polymer (B).

Moreover, the upper limit of the content of the methyl (meth)acrylate unit (b) in the polymer (B) is preferably 99.5% by mass or less, and more preferably 99% by mass or less. The polymer (B) is preferably constituted only from the methyl (meth)acrylate unit (b), and most preferably constituted only from a combination of methyl methacrylate and methyl acrylate units, except for constituent units derived from additives including a chain transfer agent.

If the content of the methyl (meth)acrylate unit (b) in the polymer (B) is within the above range, it is possible to obtain a molded article excellent in surface hardness.

The polymer (B) may contain a constituent unit(s) derived from other monomer(s) in the range of 40% by mass or less, preferably 20% by mass or less, more preferably 10% by mass or less, even more preferably 5% by mass or less. Such a constituent unit(s) derived from other monomer(s) may be a constituent unit(s) derived from a monomer(s) copolymerizable with methyl (meth)acrylate, and preferred are constituent units derived from $\alpha,\beta$-unsaturated monomers.

Examples of such a monomer include alkyl methacrylates (e.g., ethyl methacrylate, butyl methacrylate, 2-ethylhexyl methacrylate); alkyl acrylates (e.g., ethyl acrylate, butyl acrylate, 2-ethylhexyl acrylate); aromatic (meth)acrylates (e.g., phenyl methacrylate, benzyl methacrylate, phenyl acrylate, benzyl acrylate); aromatic vinyl compounds (e.g., styrene, $\alpha$-methylstyrene, vinyltoluene); vinyl cyanide compounds (e.g., acrylonitrile, methacrylonitrile), etc. These monomers may be used either alone or in combination.

Among them, preferred are alkyl acrylates (e.g., ethyl acrylate, butyl acrylate, 2-ethylhexyl acrylate) and styrene.

The polymer (B) has a mass average molecular weight (Mw) of 5,000 or higher, preferably 7,000 or higher, more preferably 9,000 or higher.

If the Mw of the polymer (B) is 5,000 or higher, excellent surface hardness can be obtained in the resulting molded articles. If the Mw of the polymer (B) is less than 5,000, the polymer (B) will have a reduced glass transition temperature, which in turn will reduce the improving effect on surface hardness in the resulting molded articles.

Moreover, the Mw of the polymer (B) is 20,000 or less, preferably 18,000 or less, more preferably 13,000 or less, and most preferably 1,0000 or less.

If the Mw of the polymer (B) is 20,000 or less, the polymer (B) has good compatibility with the polycarbonate (C) and is excellent in the improving effect on surface hardness.

There is no particular limitation on the polymerization process required to obtain the polymer (B), and any known technique may be used for this purpose, as exemplified by emulsion polymerization, suspension polymerization, solution polymerization, bulk polymerization, etc. Preferred is suspension polymerization or bulk polymerization, and more preferred is suspension polymerization. In addition, an additive(s) and others required for polymerization may optionally be added as appropriate, and examples of such an additive include a polymerization initiator, an emulsifier, a dispersant, a chain transfer agent, etc.

The polymerization temperature will vary depending on the structure and composition of monomers to be polymerized and/or the type of additive such as a polymerization initiator, but it is preferably 50° C. to 150° C., and more preferably 70° C. to 130° C. It should be noted that polymerization may be conducted under stepwise heating conditions.

The polymerization time will vary depending on the polymerization process to be used, the structure and composition of monomers to be polymerized and/or the type of additive such as a polymerization initiator, but it is preferably 1 hour to 8 hours, more preferably 2 hours to 6 hours, at the desired temperature. It should be noted that the time required to reach the desired temperature is further included in the above polymerization time.

The reaction pressure will vary depending on the polymerization process to be used, the structure and composition of monomers to be polymerized, etc., but polymerization is preferably conducted at 0 MPa (normal pressure) to 3 MPa, more preferably at 0 MPa (normal pressure) to 1 MPa.

[Polycarbonate-Based Resin (C)]

The polycarbonate-based resin (C) is not limited in any way as long as it contains a carbonate bond, i.e., has the unit —[O—R—OCO]— in its molecular backbone. R in this formula may be either or both of an aliphatic group and an aromatic group. Above all, aromatic polycarbonates obtained from aromatic dihydroxy compounds (e.g., bisphenol A) are preferred in terms of costs. Moreover, these polycarbonate-based resins may be used either alone or in combination.

The viscosity average molecular weight (Mv) of the polycarbonate-based resin (C) can be calculated by viscometry and is preferably 15,000 to 30,000, more preferably 17,000 to 25,000. If the viscosity average molecular weight is within the above range, the polycarbonate-based resin (C) has good compatibility with the polymer (A) and the polymer (B) in this embodiment and results in a molded object with excellent transparency and surface hardness.

For preparation of the polycarbonate-based resin (C), an appropriate process may be selected depending on the type of monomer(s) to be used as a starting material(s). Examples include phosgene method, transesterification method, etc. Alternatively, marketed products may also be used, as exemplified by Iupilon® S-3000 (a product of Mitsubishi Engineering-Plastics Corporation, Japan; Mv=22,000), Tarflon® FN1700 (a product of Idemitsu Kosan Co., Ltd., Japan; Mv=18,000), etc.

[Resin Composition]

The resin composition of this embodiment contains the above polymer (A), the above polymer (B) and the above polycarbonate-based resin (C).

The resin composition of this embodiment preferably contains the combined (meth)acrylic polymers, i.e., the above polymers (A) and (B) in an amount of 5% to 60% by mass and the polycarbonate-based resin (C) in an amount of 40% to 95% by mass, based on the mass of the resin composition. Moreover, the resin composition of this embodiment preferably contains the combined (meth)acrylic polymers, i.e., the above polymers (A) and (B) in an amount of 10% to 50% by mass and the polycarbonate-based resin (C) in an amount of 50% to 90% by mass. If the content of the combined (meth)acrylic polymers, i.e., the polymers (A) and (B) in the resin composition is 5% by mass or more, improvements can be expected in compatibility with the polycarbonate-based resin (C) and in fluidity. On the other hand, although too high a content of the combined (meth) acrylic polymers, i.e., the polymers (A) and (B) tends to increase haze, it is possible to prevent a reduction in the transparency of the resulting molded object if the content of the combined (meth)acrylic polymers, i.e., the polymers (A) and (B) is 60% by mass or less.

Moreover, in terms of improved surface hardness and/or compatibility with the polycarbonate resin (C), the mass ratio ((A)/(B)) of the polymer (A) and the polymer (B) is preferably in the range of 0.5/99.5 to 30/70, more preferably in the range of 2/98 to 25/75, and even more preferably in the range of 5/95 to 20/80. If the polymer (A) accounts for 0.5% by mass or more in the mass ratio ((A)/(B)) of the polymer (A) and the polymer (B), an improvement can be expected in compatibility with the polycarbonate. On the other hand, if the polymer (B) accounts for 70% by mass or more in the mass ratio ((A)/(B)) of the polymer (A) and the polymer (B), a sufficient improvement can be expected in surface hardness.

The resin composition of this embodiment may optionally contain an additional resin(s), an additive(s) and so on, as long as the effect of the present invention is not impaired.

Such an additional resin is not limited in any way, and examples include polystyrene-based resins (e.g., ABS, HIPS, PS, PAS); polyester-based resins (e.g., polyethylene terephthalate, polybutylene terephthalate); polyolefin-based resins; polymer alloys (e.g., elastomers blended with other thermoplastic resins), etc. The content of these resins is preferably within the range that does not impair the physical properties (e.g., heat resistance, impact resistance, flame retardancy) inherent to the polycarbonate-based resin (C), and more specifically is preferably 50 parts by mass or less, relative to 100 parts by mass in total of the polymer (A), the polymer (B) and the polycarbonate-based resin (C).

Such an additive is not limited in any way, and examples include UV absorbers and antioxidants as described later, as well as reinforcing agents, weathering agents, inorganic fillers, impact modifiers, flame retardants, antistatic agents, mold release agents, dyes and pigments, and fluoroolefins. Moreover, to improve the strength, stiffness, flame retardancy and other properties of the resulting molded object, it is possible to use talc, mica, calcium carbonate, glass fibers, carbon fibers, potassium titanate fibers, etc. Further, the resin composition may contain a rubber-like elastic material of two-layered core/shell structure, which is used to improve impact resistance, etc.

The resin composition of this embodiment may contain a UV absorber. Examples of a UV absorber for use in this embodiment include inorganic UV absorbers (e.g., cerium oxide, zinc oxide); and organic UV absorbers (e.g., benzotriazole compounds, benzophenone compounds, salicylate compounds, cyanoacrylate compounds, triazine compounds, oxanilide compounds, malonic acid ester compounds, hindered amine compounds, oxalic anilide compounds). Among them, preferred are organic UV absorbers, and more preferred are benzotriazole compounds (i.e., compounds having a benzotriazole structure).

Specific examples of benzotriazole compounds include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole), 2-(2'-hydroxy-3',5'-di-tert-amyl)-benzotriazole, 2-(2'-hydroxy-5'-tert-octylphenyl)benzotriazole, 2,2'-methylenebis[4-(1,1,3,3-tetramethylbutyl)-6-(2N-benzotriazol-2-yl)phenol] and so on. Among them, preferred are 2-(2'-hydroxy-5'-tert-octylphenyl)benzotriazole and 2,2'-methylenebis[4-(1,1,3,3-tetramethylbutyl)-6-(2N-benzotriazol-2-yl)phenol], and particularly preferred is 2-(2'-hydroxy-5'-tert-octylphenyl)benzotriazole. Such benzotriazole compounds may be exemplified by "Seesorb 701," "Seesorb 705," "Seesorb 703," "Seesorb 702," "Seesorb 704" and "Seesorb 709" (Shipro Kasei Kaisha Ltd., Japan), "Biosorb 520," "Biosorb 582," "Biosorb 580" and "Biosorb 583" (Kyodo Chemical Co., Ltd., Japan), "Kemisorb 71" and "Kemisorb 72" (Chemipro Kasei Kaisha, Ltd., Japan), "Cyasorb UV5411" (Cytec Industries Inc.), "LA-32," "LA-38," "LA-36," "LA-34" and "LA-31" (ADEKA Corporation, Japan), "Tinuvin P," "Tinuvin 234," "Tinuvin 326," "Tinuvin 327" and "Tinuvin 328" (Ciba Specialty Chemicals Inc.), etc.

Specific examples of benzophenone compounds include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl)methane, 2,2'-dihydroxy-4-methoxybenzophenone, 2,2'-dihydroxy-4,4'-dimethoxybenzophenone and so on. Such benzophenone compounds may be exemplified by "Seesorb 100," "Seesorb 101," "Seesorb 101S," "Seesorb 102" and "Seesorb 103" (Shipro Kasei Kaisha Ltd., Japan), "Biosorb 100," "Biosorb 110" and "Biosorb 130" (Kyodo Chemical Co., Ltd., Japan), "Kemisorb 10," "Kemisorb 11," "Kemisorb 11S," "Kemisorb 12," "Kemisorb 13" and "Kemisorb 111" (Chemipro Kasei Kaisha, Ltd., Japan), "Uvinul 400" (BASF), "Uvinul M-40" (BASF), "Uvinul MS-40" (BASF), "Cyasorb UV9," "Cyasorb UV284," "Cyasorb UV531" and "Cyasorb UV24" (Cytec Industries Inc.), "Adekastab 1413" and "Adekastab LA-51" (ADEKA Corporation, Japan), etc.

Specific examples of salicylate compounds include phenyl salicylate, 4-tert-butylphenyl salicylate and so on. Such salicylate compounds may be exemplified by "Seesorb 201" and "Seesorb 202" (Shipro Kasei Kaisha Ltd., Japan), "Kemisorb 21" and "Kemisorb 22" (Chemipro Kasei Kaisha, Ltd., Japan), etc.

Specific examples of cyanoacrylate compounds include ethyl-2-cyano-3,3-diphenyl acrylate, 2-ethylhexyl-2-cyano-3,3-diphenyl acrylate and so on. Such cyanoacrylate compounds may be exemplified by "Seesorb 501" (Shipro Kasei Kaisha Ltd., Japan), "Biosorb 910" (Kyodo Chemical Co., Ltd., Japan), "Yubisoreta 300" (Daiichi Kasei Co., Ltd., Japan), "Uvinul N-35" and "Uvinul N-539" (BASF), etc.

Specific examples of oxanilide compounds include 2-ethoxy-2'-ethyloxalinic acid bisalinide and so on. Such oxalinide compounds may be exemplified by "Sanduvor VSU" (Clariant), etc.

For use as malonic acid ester compounds, 2-(alkylidene) malonic acid esters are preferred and 2-(1-arylalkylidene) malonic acid esters are more preferred. Such malonic acid ester compounds may be exemplified by "PR-25" (Clariant Japan), "B—CAP" (Ciba Specialty Chemicals Inc.), etc.

The content of such a UV absorber for use in this embodiment is 0.05 to 2.0 parts by mass, more preferably 0.1 to 1.5 parts by mass, even more preferably 0.2 to 1.0 part by mass, relative to 100 parts by mass of the resin component comprising the above polymer (A), the above polymer (B) and the polycarbonate-based resin (C).

If the content is 0.05 parts by mass or more, there is a tendency to allow development of sufficient weather resistance. If the content is 2.0 parts by mass or less, the outgas amount during molding can be reduced and the problem of die contamination tends to be less likely to occur.

It should be noted that the above UV absorbers may be used either alone or in any combination at any ratio.

The resin composition of this embodiment may contain an antioxidant. Examples of an antioxidant for use in this embodiment include phenol-based antioxidants, amine-based antioxidants, phosphite-based antioxidants, thioether-based antioxidants and so on. These antioxidants may be used either alone or in any combination at any ratio. Among them, preferred for use are phenol-based antioxidants either alone or in combination with phosphite-based antioxidants.

Specific examples of phenol-based antioxidants include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylene bis[3-(3,5-di-tert-butyl-4-hydroxyphenyl)propionate], N,N'-hexane-1,6-diylbis[3-(3,5-di-tert-butyl-4-hydroxyphenylpropionamide), 2,4-dimethyl-6-(1-methylpentadecyl)phenol, diethyl [[3,5-bis(1,1-dimethylethyl)-4-hydroxyphenyl]methyl]phosphonate, 3,3',3",5,5',5"-hexa-tert-butyl-a,a',a"-(mesitylene-2,4,6-triyl)tri-p-cresol, 4,6-bis(octylthiomethyl)-o-cresol, ethylenebis(oxyethylene) bis[3-(5-tert-butyl-4-hydroxy-m-tolyl) propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-ylamino) phenol and so on.

Among them, preferred are pentaerythritol tetrakis[3-(3,5-di-tert-butyl-4-hydroxyphenyl)propionate] and octadecyl-3-(3,5-di-tert-butyl-4-hydroxyphenyl)-propionate. Such phenol-based antioxidants may be exemplified by "Irganox 1010" and "Irganox 1076" (CIBA), "Adekastab AO-50" and "Adekastab AO-60" (ADEKA Corporation, Japan), etc.

Specific examples of phosphite-based antioxidants include triphenyl phosphite, tris(nonylphenyl) phosphite, dilauryl hydrogen phosphite, triethyl phosphite, tridecyl phosphite, tris(2-ethylhexyl) phosphite, tris(tridecyl) phosphite, tristearyl phosphite, diphenylmonodecyl phosphite, monophenyldidecyl phosphite, diphenylmono(tridecyl) phosphite, tetraphenyl dipropylene glycol diphosphite, tetraphenyl tetra(tridecyl)pentaerythritol tetraphosphite, hydrogenated bisphenol A phenol phosphite polymers, diphenyl hydrogen phosphite, 4,4'-butylidene-bis(3-methyl-6-tert-butylphenyl di(tridecyl)phosphite) tetra(tridecyl) 4,4'-isopropylidene diphenyl diphosphite, bis(tridecyl)pentaerythritol diphosphite, bis(nonylphenyl)pentaerythritol diphosphite, dilauryl pentaerythritol diphosphite, distearyl pentaerythritol diphosphite, tris(4-tert-butylphenyl) phosphite, tris(2,4-di-tert-butylphenyl) phosphite, hydrogenated bisphenol A pentaerythritol phosphite polymers, bis(2,4-di-tert-butylphenyl)-pentaerythritol diphosphite, bis(2,6-di-tert-butyl-4-methylphenyl)pentaerythritol diphosphite, 2,2'-methylenebis(4,6-di-tert-butylphenyl)octyl phosphite, bis(2,4-dicumylphenyl)pentaerythritol diphosphite and so on.

Specific examples of amine-based antioxidants include aromatic amines, as exemplified by poly(2,2,4-trimethyl-1,2-dihydroquinoline, 6-ethoxy-1,2-dihydro-2,2,4-trimethylquinoline, phenyl-α-naphthylamine, 4,4-bis(α,α-dimethyldenzyl)-diphenylamine, (p-toluenesulfonylamido) diphenylamine, N,N'-diphenyl-p-phenylenediamine, N,N'-di-β-naphthyl-p-phenylenediamine, N,N'-di(1,4-dimethylpentyl)-p-phenylenediamine, N-phenyl-N'-isopropyl-p-phenylenediamine, N-phenyl-N'-1,3-dimethylbutyl-p-phenylenediamine, N-(1-methylheptyl)-N'-phenyl-p-phenylenediamine, etc.

Specific examples of thioether-based antioxidants include pentaerythrityl tetrakis(3-laurylthiopropionate), dilauryl-3,3'-thiodipropionate, dimyristyl-3,3'-thiodipropionate, distearyl-3,3'-thiodipropionate and so on.

The content of such an antioxidant is 0.01 to 1.0 part by mass, more preferably 0.05 to 0.8 parts by mass, even more preferably 0.1 to 0.5 parts by mass, relative to 100 parts by mass of the resin component comprising the above polymer (A), the above polymer (B) and the polycarbonate-based resin (C).

If the content of the antioxidant is 0.01 parts by mass or more, there is a tendency to exert a sufficient effect as an antioxidant. If the content of the antioxidant is 1.0 part by mass or less, there is a tendency to achieve higher cost efficiency because excessive addition due to saturation of the effect can be minimized.

The resin composition of this embodiment may be prepared by blending the above polymer (A), the above polymer (B) and the above polycarbonate-based resin (C) in powder state, or by blending these components in molten state under heating.

Alternatively, the resin composition of this embodiment may be prepared as follows: the above polymer (A) and the above polymer (B) are blended in powder state or these components are blended in molten state under heating, and then further blended with the above polycarbonate-based resin (C) which is added in powder state or heated to molten state. For preparation of the above blend, it is possible to use a Henschel mixer, a Banbury mixer, a single-screw extruder, a double-screw extruder, a twin roller, a kneader, a brabender or the like, by way of example.

[Blend]

According to another embodiment, it is possible to provide a blend of the above polymer (A) and the above polymer (B). Namely, the blend of this embodiment comprises the above polymer (A) containing 45% by mass or more of the (meth)acrylate unit (a) represented by formula (1), and the above polymer (B) containing 60% by mass or more of the methyl (meth)acrylate unit (b) and having a mass average molecular weight of 5,000 to 20,000.

In terms of improved surface hardness and/or compatibility with the polycarbonate resin (C), the mass ratio ((A)/(B)) of the polymer (A) and the polymer (B) in the blend is preferably in the range of 0.5/99.5 to 30/70, more preferably in the range of 2/98 to 25/75, and even more preferably in the range of 5/95 to 20/80. If the polymer (A) accounts for 0.5% by mass or more in the mass ratio ((A)/(B)) of the polymer (A) and the polymer (B), an improvement can be expected in compatibility with the polycarbonate. On the other hand, if the polymer (B) accounts for 70% by mass or more in the mass ratio ((A)/(B)) of the polymer (A) and the polymer (B), a sufficient improvement can be expected in surface hardness.

The blend of this embodiment may optionally contain the above-mentioned additional resin(s), additive(s) and so on, as long as the effect of the present invention is not impaired.

The blend of this embodiment may be prepared by blending the above polymer (A) and the above polymer (B) in powder state, or by blending these components in molten state under heating. For preparation of the blend, it is possible to use a Henschel mixer, a Banbury mixer, a single-screw extruder, a double-screw extruder, a twin roller, a kneader, a brabender or the like, by way of example.

[Molded Object]

The molded object of this embodiment is obtained by molding the above resin composition.

By using the above resin composition, a molded object with both excellent transparency and surface hardness can be obtained even when molded under high temperature conditions. For example, when the blend of the polymer (A) and the polymer (B) is melt-kneaded with the polycarbonate-based resin (C) (viscosity average molecular weight: 22,000) at a ratio of 30/70 (% by mass) and then injection molded at an injection temperature of 300° C. at an injection speed of 300 m/sec and at a die temperature of 80° C. to obtain a plate strip of 1.5 mm thickness, the haze of this plate strip is preferably 12% or less, more preferably 10% or less, and particularly preferably 5% or less. Moreover, the pencil hardness of the above plate strip is preferably HB or higher, and more preferably F or higher.

As described above, the molded object of this embodiment not only retains excellent mechanical strength, heat resistance, electrical properties, dimensional stability, flame retardancy, transparency and other properties of the polycarbonate-based resin (C), but also is excellent in surface hardness. Accordingly, the molded object of this embodiment can be used for electrical, electronic and OA appliances, optical media, automobile components, building components, etc.

Molding techniques for the molded object of this embodiment include, for example, compression molding, transfer molding, injection molding, blow molding, extrusion molding, laminate molding and calender molding. In the case of using injection molding, conditions for injection molding are preferably set to an injection temperature of 230° C. to 330° C., an injection speed of 10 to 500 mm/sec and a die temperature of 60° C. or higher, in terms of improved surface hardness. Moreover, the resin composition of this embodiment is also preferred in terms of productivity, because the injection speed can be increased.

EXAMPLES

The present invention will be further described in more detail by reference to the following examples, which are not intended to limit the technical scope of the present invention. It should be noted that "parts" and "%" used in the following examples and comparative examples are intended to mean "parts by mass" and "% by mass," respectively.

Moreover, in the examples and the comparative examples, various physical properties were measured in the following manner.

[Molecular Weight of (Meth)Acrylic Polymers]

(Meth)acrylic polymers were each dissolved in tetrahydrofuran (THF) and measured by gel permeation chromatography. It should be noted that Mw, Mn and Mw/Mn of each polymer were calculated based on a calibration curve prepared from standard polystyrenes.

Apparatus: HLC-8320 GPC EcoSEC (Tosoh Corporation, Japan)
Column: TSK gel Super H M-H×3 columns (Tosoh Corporation, Japan)
Mobile phase solvent: THF
Flow rate: 0.6 mL/minute
Temperature: 40° C.
Sample concentration: 0.1%
Sample injection volume: 10 μL
Detector: RI (UV)

[Pencil Hardness]

Plate strips of 1.5 mm thickness were prepared and measured for their pencil hardness at which no scratch was observed on the strip surface, in accordance with JIS K5600-5-4.

[Transparency]

Using a haze meter NDH4000 (Nippon Denshoku Industries Co., Ltd., Japan), plate strips of 1.5 mm thickness were measured for their haze in accordance with JIS K 7136.

(1) Synthesis of Polymer (A)

Synthesis Example 1: Synthesis of Polymer (A)-a

A heatable high pressure reactor equipped with a stirring unit was charged with 200 parts by mass of deionized water, 0.5 parts by mass of tertiary calcium phosphate serving as a suspension stabilizer, and 0.01 parts by mass of sodium dodecylbenzenesulfonate serving as a surfactant, followed by stirring. Separately, 97 parts by mass of 4-phenylbenzyl methacrylate, 3 parts by mass of methyl acrylate, 0.3 parts by mass of Perbutyl E (NOF Corporation, Japan) serving as an initiator, and 0.001 parts by mass of normal-octylmercaptan (nOM) serving as a chain transfer agent were mixed to prepare a homogeneous monomer solution, which was then added to the reaction vessel. The reaction vessel was filled with nitrogen up to 0.1 MPa. The reaction was conducted at 110° C. for 1 hour and then at 120° C. for 2 hours to complete the polymerization reaction. The resulting bead-shaped polymer was washed with water and dried to obtain polymer (A)-a.

Synthesis Example 2: Synthesis of Polymer (A)-b

The same procedure as used in Synthesis Example 1 was repeated to obtain polymer (A)-b, except that normal-octylmercaptan (nOM) serving as a chain transfer agent was used in an amount of 0.01 parts by mass.

Synthesis Example 3: Synthesis of Polymer (A)-c

The same procedure as used in Synthesis Example 2 was repeated to obtain polymer (A)-c, except that 4-phenylbenzyl methacrylate was used in an amount of 50 parts by mass and methyl methacrylate was used in an amount of 47 parts by mass.

Synthesis Example 4: Synthesis of Polymer (A)-d

The same procedure as used in Synthesis Example 2 was repeated to obtain polymer (A)-d, except that 4-phenylbenzyl methacrylate was replaced with phenyl methacrylate.

Synthesis Example 5: Synthesis of Polymer (A)-e

The same procedure as used in Synthesis Example 2 was repeated to obtain polymer (A)-e, except that 4-phenylbenzyl methacrylate was replaced with benzyl methacrylate.

Synthesis Example 6: Synthesis of Polymer (A)-f

The same procedure as used in Synthesis Example 1 was repeated to obtain polymer (A)-f, except that 4-phenylbenzyl methacrylate was used in an amount of 45 parts by mass and methyl methacrylate was used in an amount of 52 parts by mass.

Synthesis Example 7: Synthesis of Polymer (A)-g

The same procedure as used in Synthesis Example 1 was repeated to obtain polymer (A)-g, except that 4-phenylbenzyl methacrylate was replaced with 2-phenylbenzyl methacrylate.

Synthesis Example 8: Synthesis of Polymer (A)-h

The same procedure as used in Synthesis Example 1 was repeated to obtain polymer (A)-h, except that 4-phenylbenzyl methacrylate was replaced with 4-benzylbenzyl methacrylate.

Synthesis Example 9: Synthesis of Polymer (A)-i

The same procedure as used in Synthesis Example 1 was repeated to obtain polymer (A)-i, except that 4-phenylbenzyl methacrylate was replaced with 4-phenoxybenzyl methacrylate.

Synthesis Example 10: Synthesis of Polymer (A)-j

The same procedure as used in Synthesis Example 1 was repeated to obtain polymer (A)-j, except that 4-phenylbenzyl methacrylate was replaced with 4-(phenylsulfonyl)benzyl methacrylate.

(2) Synthesis of Polymer (B)

Synthesis Example 11: Synthesis of Polymer (B)-a

The same procedure as used in Synthesis Example 1 was repeated to obtain polymer (B)-a, except that 4-phenylbenzyl methacrylate was replaced with methyl methacrylate and normal-octylmercaptan (nOM) serving as a chain transfer agent was used in an amount of 3.5 parts by mass.

Synthesis Example 12: Synthesis of Polymer (B)-b

The same procedure as used in Synthesis Example 11 was repeated to obtain polymer (B)-b, except that normal-octylmercaptarl (nOM) serving as a chain transfer agent was used in an amount of 2.5 parts by mass.

Synthesis Example 13: Synthesis of Polymer (B)-c

The same procedure as used in Synthesis Example 11 was repeated to obtain polymer (B)-c, except that normal-octylmercaptan (nOM) serving as a chain transfer agent was used in an amount of 1.25 parts by mass.

Synthesis Example 14: Synthesis of Polymer (B)-d

The same procedure as used in Synthesis Example 11 was repeated to obtain polymer (B)-d, except that normal-octylmercaptan (nOM) serving as a chain transfer agent was used in an amount of 0.75 parts by mass.

In Table 1, the polymers obtained in Synthesis Examples 1 to 14 shown above are summarized for their composition (the numerical values in Table 1 each represent a mass ratio). Moreover, in Table 2, the polymers obtained in Synthesis Examples 1 to 14 shown above are summarized for their physical properties.

TABLE 1

| Polymer | 4-Phenyl-benzyl methacrylate | 2-Phenyl-benzyl methacrylate | 4-Benzyl-benzyl methacrylate | 4-Phenoxy-benzyl methacrylate | 4-(Phenyl-sulfonyl)benzyl methacrylate | Phenyl methacrylate | Benzyl methacrylate | Methyl methacrylate | Methyl acrylate | Normal octyl-mercaptan (n-OM) |
|---|---|---|---|---|---|---|---|---|---|---|
| (A)-a | 97 | | | | | | | | 3 | 0.001 |
| (A)-b | 97 | | | | | | | | 3 | 0.01 |
| (A)-c | 50 | | | | | | | 47 | 3 | 0.01 |
| (A)-d | | | | | | 97 | | | 3 | 0.01 |

TABLE 1-continued

| Polymer | 4-Phenyl-benzyl methacrylate | 2-Phenyl-benzyl methacrylate | 4-Benzyl-benzyl methacrylate | 4-Phenoxy-benzyl methacrylate | 4-(Phenyl-sulfonyl)benzyl methacrylate | Phenyl methacrylate | Benzyl methacrylate | Methyl methacrylate | Methyl acrylate | Normal octyl-mercaptan (n-OM) |
|---|---|---|---|---|---|---|---|---|---|---|
| (A)-e | | | | | | 97 | | | 3 | 0.01 |
| (A)-f | 45 | | | | | | | 52 | 3 | 0.001 |
| (A)-g | | 97 | | | | | | | 3 | 0.001 |
| (A)-h | | | 97 | | | | | | 3 | 0.001 |
| (A)-i | | | | 97 | | | | | 3 | 0.001 |
| (A)-j | | | | | 97 | | | | 3 | 0.001 |
| (B)-a | | | | | | | | 97 | 3 | 3.5 |
| (B)-b | | | | | | | | 97 | 3 | 2.5 |
| (B)-c | | | | | | | | 97 | 3 | 1.25 |
| (B)-d | | | | | | | | 97 | 3 | 0.75 |

TABLE 2

| Polymer | Number average molecular weight (Mn) | Mass average molecular weight (Mw) | Polydispersity index (Mw/Mn) |
|---|---|---|---|
| (A)-a | 850,000 | 1,500,000 | 1.76 |
| (A)-b | 82,000 | 150,000 | 1.83 |
| (A)-c | 81,000 | 150,000 | 1.85 |
| (A)-d | 84,000 | 150,000 | 1.79 |
| (A)-e | 83,000 | 150,000 | 1.81 |
| (A)-f | 860,000 | 1,560,000 | 1.81 |
| (A)-g | 890,000 | 1,640,000 | 1.84 |
| (A)-h | 910,000 | 1,690,000 | 1.86 |
| (A)-i | 920,000 | 1,590,000 | 1.73 |
| (A)-j | 860,000 | 1,490,000 | 1.73 |
| (B)-a | 4,200 | 7,500 | 1.79 |
| (B)-b | 5,600 | 9,800 | 1.75 |
| (B)-c | 10,000 | 18,000 | 1.80 |
| (B)-d | 19,000 | 35,000 | 1.84 |

(3) Preparation of Resin Pellets

The polymers (A) and (B) obtained in the above synthesis examples, and Iupilon® S-3000 (Mitsubishi Engineering-Plastics Corporation, Japan; viscosity average molecular weight: 22,000), which was used as a polycarbonate-based resin, were blended at the mass ratios indicated in Table 3. After being mixed in a tumbler for 20 minutes, each blend was fed into a single-vented "TEX30HSST" (The Japan Steel Works, Ltd., Japan) and kneaded under the following conditions: a screw speed of 200 rpm, a discharge rate of 20 kg/hour and a barrel temperature of 260° C. The molten resin extruded into strands was quenched in a water bath and pelletized using a pelletizer to thereby obtain pellets of each resin composition.

(4) Production of Molded Objects

The pellets obtained in the above manner were dried at 100° C. for 5 hours and then injection molded in an injection molding machine "SE100DU" (Sumitomo Heavy Industries, Ltd., Japan) using a steel die at the injection temperature and injection speed indicated below and at a die temperature of 80° C. to thereby obtain plate strips of 50×90×1.5 mm thickness.

Injection conditions I: injection temperature: 260° C., injection speed: 200 mm/sec Injection conditions II: injection temperature: 300° C., injection speed: 200 mm/sec Injection conditions III: injection temperature: 260° C., injection speed: 300 mm/sec Injection conditions IV: injection temperature: 300° C., injection speed: 300 mm/sec Pencil hardness and transparency were measured for each plate strip as described above. The results obtained are shown in Table 3.

TABLE 3

| | Content in resin composition | | | Transparency (%) | | | |
|---|---|---|---|---|---|---|---|
| | Polymer (A) and Polymer (B) used and mixing ratio thereof (% by mass) | (% by mass) (Polymer (A) + Polymer (B))/ Polycarbonate-based resin (C) | Pencil hardness | Injection conditions I | Injection conditions II | Injection conditions III | Injection conditions IV |
| Example 1 | (A)-a/(B)-b = 5/95 | 30/70 | F | 0.8 | 0.9 | 0.9 | 1.5 |
| Example 2 | (A)-a/(B)-b = 20/80 | 30/70 | HB | 0.9 | 0.9 | 1.1 | 1.4 |
| Example 3 | (A)-a/(B)-b = 5/95 | 40/60 | H | 0.8 | 1.0 | 1.1 | 1.5 |
| Example 4 | (A)-a/(B)-c = 5/95 | 30/70 | F | 0.9 | 1.3 | 1.4 | 2.0 |
| Example 5 | (A)-b/(B)-b = 5/95 | 30/70 | F | 1.0 | 1.5 | 1.8 | 2.5 |
| Example 6 | (A)-c/(B)-b = 5/95 | 30/70 | F | 0.9 | 1.2 | 1.3 | 1.8 |
| Example 7 | (A)-f/(B)-b = 5/95 | 30/70 | F | 1.0 | 1.2 | 1.8 | 2.6 |
| Example 8 | (A)-g/(B)-b = 5/95 | 30/70 | F | 0.8 | 1.1 | 1.4 | 1.9 |
| Example 9 | (A)-h/(B)-b = 5/95 | 30/70 | F | 0.9 | 1.1 | 1.3 | 1.5 |
| Example 10 | (A)-i/(B)-b = 5/95 | 30/70 | F | 1.0 | 1.3 | 1.5 | 1.9 |
| Example 11 | (A)-j/(B)-b = 5/95 | 30/70 | F | 0.9 | 1.1 | 1.6 | 1.7 |
| Example 12 | (A)-a/(B)-a = 5/95 | 30/70 | HB | 0.7 | 0.7 | 0.9 | 1.1 |
| Comparative Example 1 | (A)-a/(B)-d = 5/95 | 30/70 | F | 1.5 | 6.5 | 8.3 | 16.5 |
| Comparative Example 2 | (A)-d/(B)-b = 5/95 | 30/70 | F | 0.9 | 5.5 | 9.2 | 16.0 |
| Comparative Example 3 | (A)-e/(B)-b = 5/95 | 30/70 | F | 1.0 | 8.0 | 10.1 | 17.1 |

As shown in Table 3, when resin compositions according to the embodiment where the polymer (A), the polymer (B) and the polycarbonate-based resin (C) are blended are provided for injection molding (Examples 1 to 12), the resulting molded objects have high surface hardness and also have high transparency even at high injection speed and high injection temperature.

On the other hand, when the polymer containing the methyl (meth)acrylate unit (b) has a mass average molecular weight greater than 20,000 (Comparative Example 1), transparency is reduced under some injection conditions. Likewise, when using a polymer containing a (meth)acrylate unit where its ester moiety and its benzene ring are directly attached to each other (Comparative Example 2) or when using a polymer containing a (meth)acrylate unit having one benzene ring even where its ester moiety and its benzene ring are not directly attached to each other (Comparative Example 3), transparency is reduced under some injection conditions.

Although some embodiments of the present invention have been described above, these embodiments are provided for illustrative purposes only and are not intended to limit the scope of the present invention. These novel embodiments may be implemented in various other modes, and various omissions, substitutions and/or modifications may be made without departing from the spirit of the present invention. These embodiments and variants thereof fall within the scope or sprit of the present invention and also fall within the scope of the claimed inventions and equivalents thereof.

The invention claimed is:

1. A resin composition, which comprises a polymer (A) containing 45% by mass or more of a (meth)acrylate unit (a) represented by the following formula (1) and having a mass average molecular weight of 50,000 to 5,000,000, a polymer (B) containing 60% by mass or more of a methyl (meth) acrylate unit (b) and having a mass average molecular weight of 5,000 to 20,000, and a polycarbonate-based resin (C):

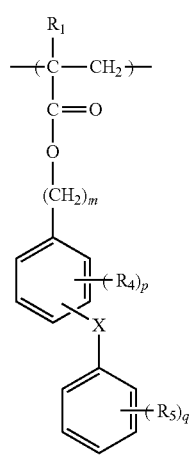

(1)

wherein in formula (1),
X is a single bond or a divalent group selected from the group consisting of —C($R_2$)($R_3$)—, —C(=O)—, —O—, —OC(=O)—, —OC(=O)O—, —S—, —SO—, —$SO_2$— and any combination thereof,
wherein $R_2$ and $R_3$ are each independently a hydrogen atom, a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a phenyl group or a phenylphenyl group; or $R_2$ and $R_3$ may be linked to each other together with the carbon atom to which they are attached to thereby form a cyclic alkyl group containing 3 to 10 carbon atoms;
$R_1$ is a hydrogen atom or a methyl group;
$R_4$ and $R_5$ are each independently a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a halogen atom, a phenyl group or a phenylphenyl group;
m is an integer of 1 to 10;
p is an integer of 0 to 4; and
q is an integer of 0 to 5.

2. The resin composition according to claim 1, wherein the polymer (A) contains 50% by mass or more of the (meth)acrylate unit (a) represented by formula (1).

3. The resin composition according to claim 1, wherein in formula (1), m is an integer of 1 to 3.

4. The resin composition according to claim 1, wherein in formula (1), X is a single bond, —C($R_2$)($R_3$)—, —C(=O)—, —O—, —SO— or —$SO_2$—.

5. The resin composition according to claim 1, wherein in formula (1), p and q are each 0.

6. The resin composition according to claim 1, wherein the combined content of the polymer (A) and the polymer (B) is 5% to 60% by mass and the content of the polycarbonate-based resin (C) is 40% to 95% by mass.

7. The resin composition according to claim 6, wherein the mass ratio ((A)/(B)) of the polymer (A) and the polymer (B) is 0.5/99.5 to 30/70.

8. A blend, which comprises a polymer (A) containing 45% by mass or more of a (meth)acrylate unit (a) represented by the following formula (1) and having a mass average molecular weight of 50,000 to 5,000,000, and a polymer (B) containing 60% by mass or more of a methyl (meth)acrylate unit (b) and having a mass average molecular weight of 5,000 to 20,000:

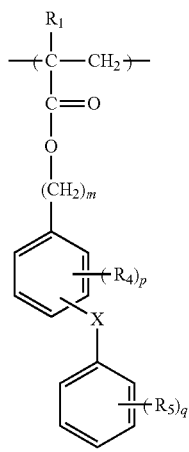

(1)

wherein in formula (1),

X is a single bond or a divalent group selected from the group consisting of —C($R_2$)($R_3$)—, —C(=O)—, —O—, —OC(=O)—, —OC(=O)O—, —S—, —SO—, —$SO_2$— and any combination thereof, wherein $R_2$ and $R_3$ are each independently a hydrogen atom, a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a phenyl group or a phenylphenyl group; or $R_2$ and $R_3$ may be linked to each other together with the carbon atom to which they are attached to thereby form a cyclic alkyl group containing 3 to 10 carbon atoms;

$R_1$ is a hydrogen atom or a methyl group;

$R_4$ and $R_5$ are each independently a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a halogen atom, a phenyl group or a phenylphenyl group;

m is an integer of 1 to 10;

p is an integer of 0 to 4; and q is an integer of 0 to 5.

9. The blend according to claim 8, wherein the polymer (A) contains 50% by mass or more of the (meth)acrylate unit (a) represented by formula (1).

10. The blend according to claim 8, wherein in formula (1), m is an integer of 1 to 3.

11. The blend according to claim 8, wherein in formula (1), X is a single bond, —C($R_2$)($R_3$)—, —C(=O)—, —O—, —SO— or —$SO_2$—.

12. The blend according to claim 8, wherein in formula (1), p and q are each 0.

13. The blend according to claim 8, wherein the mass ratio ((A)/(B)) of the polymer (A) and the polymer (B) is 0.5/99.5 to 30/70.

14. A molded object molded from the resin composition according to claim 1.

* * * * *